(12) United States Patent
Kim

(10) Patent No.: US 11,541,833 B2
(45) Date of Patent: Jan. 3, 2023

(54) APPARATUS AND METHOD TO DETECT CRASH TYPE OF VEHICLE

(71) Applicant: HYUNDAI MOBIS Co., Ltd., Seoul (KR)

(72) Inventor: Byung Su Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 188 days.

(21) Appl. No.: 16/921,942

(22) Filed: Jul. 7, 2020

(65) Prior Publication Data
US 2021/0009063 A1    Jan. 14, 2021

(30) Foreign Application Priority Data
Jul. 8, 2019  (KR) .......................... 10-2019-0082006

(51) Int. Cl.
| | | |
|---|---|---|
| H04N 5/44 | (2011.01) |
| B60R 21/0136 | (2006.01) |
| G08G 1/16 | (2006.01) |
| B60R 21/34 | (2011.01) |

(52) U.S. Cl.
CPC .......... *B60R 21/0136* (2013.01); *B60R 21/34* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 5,490,069 A | * | 2/1996 | Gioutsos | B60R 21/013 340/436 |
| 5,684,701 A | * | 11/1997 | Breed | B60R 21/013 180/282 |
| 6,036,225 A | * | 3/2000 | Foo | B60R 21/0156 701/45 |
| 6,278,924 B1 | * | 8/2001 | Gioutsos | B60R 21/013 280/735 |
| 6,438,475 B1 | * | 8/2002 | Gioutsos | B60R 21/01558 180/274 |
| 6,532,408 B1 | * | 3/2003 | Breed | B60R 21/0132 180/282 |

(Continued)

FOREIGN PATENT DOCUMENTS

| | | | | |
|---|---|---|---|---|
| EP | 709256 A1 | * | 5/1996 | ......... B60R 21/013 |
| EP | E P-1955911 A2 | * | 8/2008 | ......... B60R 21/0132 |

(Continued)

*Primary Examiner* — Munear T Akki
(74) *Attorney, Agent, or Firm* — H.C. Park & Associates, PLC

(57) ABSTRACT

An apparatus and a method to detect a crash type of a vehicle provides a front acceleration sensor configured to sense a left front acceleration and a right front acceleration in the front of a vehicle; a center acceleration sensor configured to sense a center left acceleration and a center right acceleration in the center of the vehicle; a collision direction detection unit configured to detect a collision direction of the vehicle using the accelerations; a high frequency component detection unit configured to detect high frequency components by filtering the accelerations; and a crash type detection unit configured to detect a crash type of the vehicle using the accelerations of the high frequency components in accordance with the collision direction.

20 Claims, 6 Drawing Sheets

(56) References Cited

U.S. PATENT DOCUMENTS

| | | | | |
|---|---|---|---|---|
| 6,609,053 B1 * | 8/2003 | Breed | ............... | B60R 21/015 |
| | | | | 280/735 |
| 2006/0232052 A1 * | 10/2006 | Breed | ............ | B60R 21/0136 |
| | | | | 280/735 |
| 2008/0185825 A1 * | 8/2008 | Stuetzler | .......... | B60R 21/0152 |
| | | | | 280/735 |

FOREIGN PATENT DOCUMENTS

| | | | | | |
|---|---|---|---|---|---|
| JP | 2004268627 A | * | 9/2004 | | |
| JP | 2010540347 A | * | 12/2010 | | |
| WO | WO-9303677 A2 | * | 3/1993 | ......... | A61B 18/1206 |

* cited by examiner

<FIXED WALL>

<LOCAL COLLISION>

<VEHICLE-TO-VEHICLE SLOPE COLLISION>

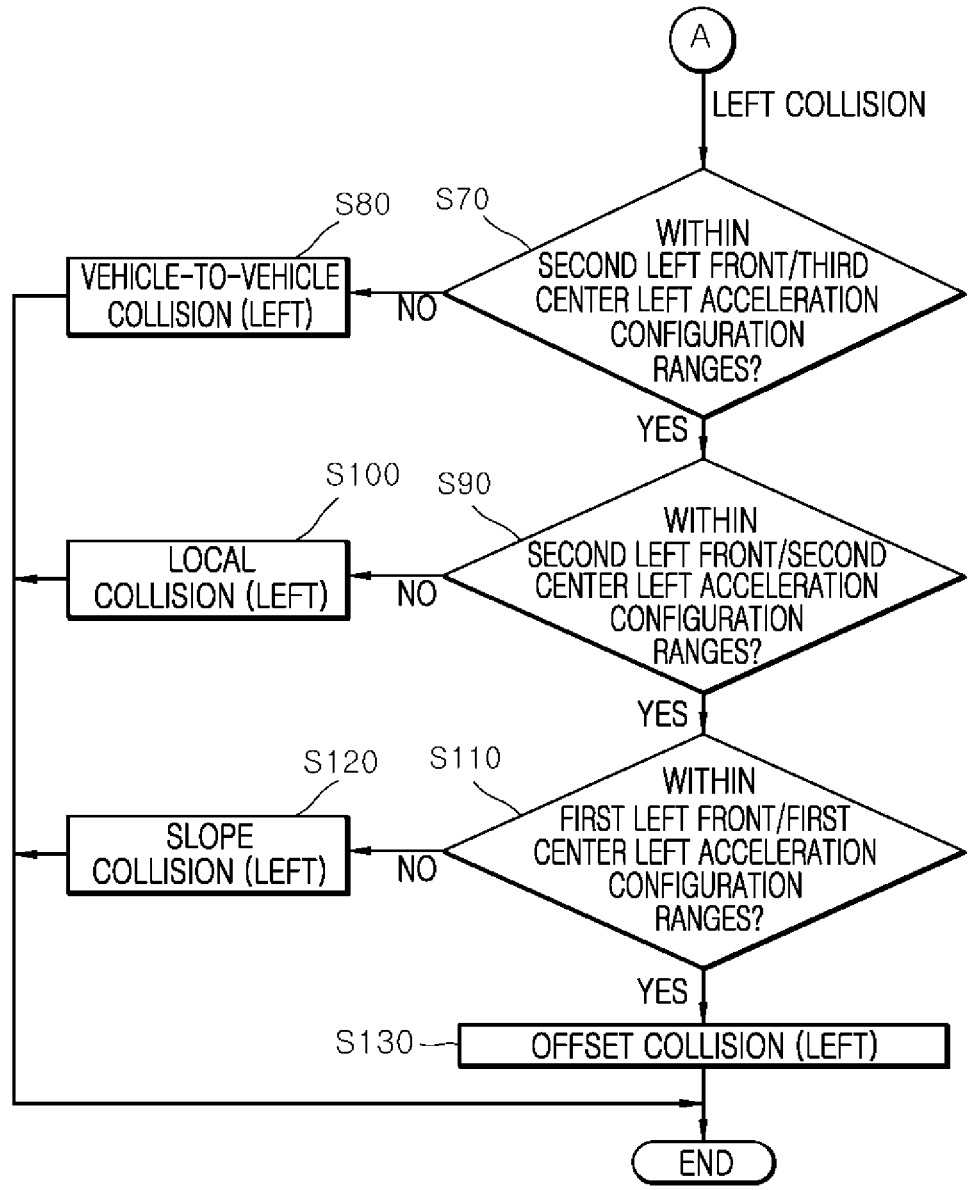

APPARATUS AND METHOD TO DETECT CRASH TYPE OF VEHICLE

CROSS-REFERENCE TO RELATED APPLICATION

This application claims priority from and the benefit of Korean Patent Application No. 10-2019-0082006, filed on Jul. 8, 2019, which is hereby incorporated by reference for all purposes as if set forth herein.

BACKGROUND

Field

Exemplary embodiments relate to an apparatus and a method to detect a crash type of a vehicle, and more particularly, to an apparatus and a method to detect a crash type of a vehicle using high frequency components of an acceleration being input from a sensor configured to sense vehicle collision.

Discussion of the Background

Airbags being deployed to prevent injury when a vehicle collision accident occurs include front airbags including a driver's seat airbag and a passenger airbag and side (curtain) airbags being deployed in response to broadside collision.

An airbag deployment system includes a front collision sensor mounted on a vehicle bumper side, that is, on a side member or a front end module (FEM), to sense head-on collision through an acceleration signal, a side collision sensor mounted on a side part of a vehicle body to sense broadside collision through an acceleration signal, a side pressure sensor sensing the broadside collision through a pressure signal, and an airbag control unit controlling deployment of the driver's seat airbag or the passenger airbag based on a sensing signal of the front collision sensor or controlling deployment of the side airbag based on the sensing signals of the side collision sensor and the side pressure sensor.

The front collision sensor and the side collision sensor may not separately exist, but may be mounted in the airbag control unit as sensors configured to sense accelerations in vertical and horizontal directions of the vehicle.

Accordingly, the airbag control unit controls the deployment of the driver's seat airbag or the passenger airbag or the deployment of the side airbag based on the signals of the side pressure sensor and the sensors configured to sense the accelerations in vertical (ACU-X) and horizontal (ACU-Y) directions of the vehicle in the airbag control unit.

If the sensing signal (ACU-Y) is sensed as a sensing signal value that exceeds a threshold value and the sensing signal of the side collision sensor or the sensing signal of the side pressure sensor is sensed as a sensing signal value that exceeds a threshold value at the same time, the airbag control unit deploys the side airbag at a specific deployment time.

However, in an actual field, various angle and speed collisions may occur, and in case of using only the accelerations input from the respective sensors as described above, it is difficult to discriminate a crash type, for example, fixed wall collision, vehicle-to-vehicle collision, local collision, slope collision, and offset collision from one another, and as a result, negative influences are exerted on accuracy of the airbag deployment time and the airbag deployment performance.

The above information disclosed in this Background section is only for enhancement of understanding of the background of the invention and, therefore, it may contain information that does not constitute prior art.

SUMMARY

Exemplary embodiments of the present invention provide an apparatus and a method to detect a crash type of a vehicle using high frequency components of accelerations input from sensors configured to sense vehicle collision.

Embodiments include an apparatus configured to detect a crash type of a vehicle includes a front acceleration sensor configured to sense a left front acceleration and a right front acceleration in the front of a vehicle; a center acceleration sensor configured to sense a center left acceleration and a center right acceleration in the center of the vehicle; a collision direction detection unit configured to detect a collision direction of the vehicle using the left front acceleration, the right front acceleration, the center left acceleration, and the center right acceleration; a high frequency component detection unit configured to detect high frequency components by filtering the left front acceleration, the right front acceleration, the center left acceleration, and the center right acceleration; and a crash type detection unit configured to detect a crash type of the vehicle using the left front acceleration, the right front acceleration, the center left acceleration, and the center right acceleration of the high frequency components in accordance with the collision direction.

The collision direction detection unit includes an integration unit configured to integrate the left front acceleration, the right front acceleration, the center left acceleration, and the center right acceleration; a comparison unit configured to compare the left front acceleration and the right front acceleration integrated by the integration unit with each other and to compare the center left acceleration and the center right acceleration with each other; and a collision direction discrimination unit configured to discriminate the collision direction based on the result of comparing the left front acceleration and the right front acceleration with each other and the result of comparing the center left acceleration and the center right acceleration with each other.

The collision direction discrimination unit is configured to discriminate the collision direction as a left collision in case that the left front acceleration is higher than the right front acceleration and the center left acceleration is higher than the center right acceleration, and to discriminate the collision direction as a right collision in case that the right front acceleration is higher than the left front acceleration and the center right acceleration is higher than the center left acceleration.

The crash type detection unit is configured to detect the crash type in case that the collision direction is the left collision or the right collision.

The crash type detection unit is configured to detect the crash type in accordance with a configuration range including the left front acceleration, the right front acceleration, the center left acceleration, and the center right acceleration of the high frequency components.

The crash type detection unit is configured to discriminate the crash type as a vehicle-to-vehicle collision in a direction of a driver's seat in case that the left front acceleration is within a second left front acceleration range of the configuration range and the center left acceleration is within a third center left acceleration range of the configuration range.

The crash type detection unit is configured to discriminate the crash type as a vehicle-to-vehicle collision in a direction of a passenger seat in case that the right front acceleration is within a second right front acceleration range of the configuration range and the center right acceleration is within a third center right acceleration range of the configuration range.

The crash type detection unit is configured to discriminate the crash type as a local collision in the direction of the driver's seat in case that the left front acceleration is within the second left front acceleration range of the configuration range and the center left acceleration is within a second center left acceleration range of the configuration range.

The crash type detection unit is configured to discriminate the crash type as a local collision in the direction of the passenger seat in case that the right front acceleration is within the second right front acceleration range of the configuration range and the center right acceleration is within a second center right acceleration range of the configuration range.

The crash type detection unit is configured to discriminate the crash type as a slope collision in the direction of the driver's seat in case that the left front acceleration is within a first left front acceleration range of the configuration range and the center left acceleration is within a first center left acceleration range of the configuration range.

The crash type detection unit is configured to discriminate the crash type as a slope collision in the direction of the passenger seat in case that the right front acceleration is within a first right front acceleration range of the configuration range and the center right acceleration is within a first center right acceleration range of the configuration range.

The crash type detection unit is configured to discriminate the crash type as an offset collision in the direction of the driver's seat in case that the left front acceleration is not included in the first and second left front acceleration ranges of the configuration range and the center left acceleration is not included in the first to third center left acceleration ranges of the configuration range.

The crash type detection unit is configured to discriminate the crash type as an offset collision in the direction of the passenger seat in case that the right front acceleration is not included in the first and second right front acceleration ranges of the configuration range and the center right acceleration is not included in the first to third center right acceleration ranges of the configuration range.

Embodiments also include a method to detect a crash type of a vehicle includes sensing, by a front acceleration sensor, a left front acceleration and a right front acceleration in the front of a vehicle; sensing, by a center acceleration sensor, a center left acceleration and a center right acceleration in the center of the vehicle; detecting, by a collision direction detection unit, a collision direction of the vehicle using the left front acceleration, the right front acceleration, the center left acceleration, and the center right acceleration; detecting, by a high frequency component detection unit, high frequency components by filtering the left front acceleration, the right front acceleration, the center left acceleration, and the center right acceleration; and detecting, by a crash type detection unit, a crash type of the vehicle using the left front acceleration, the right front acceleration, the center left acceleration, and the center right acceleration of the high frequency components in case that the collision direction is a left collision or a right collision.

In the detecting of the collision direction of the vehicle, the collision direction detection unit discriminates the collision direction as the left collision in case that the left front acceleration is higher than the right front acceleration and the center left acceleration is higher than the center right acceleration, and discriminates the collision direction as the right collision in case that the right front acceleration is higher than the left front acceleration and the center right acceleration is higher than the center left acceleration.

In the detecting of the crash type of the vehicle, the crash type detection unit detects the crash type in accordance with a configuration range including the left front acceleration, the right front acceleration, the center left acceleration, and the center right acceleration of the high frequency components.

In the detecting of the crash type of the vehicle, the crash type detection unit discriminates the crash type as a vehicle-to-vehicle collision in a direction of a driver's seat in case that the left front acceleration is within a second left front acceleration range of the configuration range and the center left acceleration is within a third center left acceleration range of the configuration range.

In the detecting of the crash type of the vehicle, the crash type detection unit discriminates the crash type as a vehicle-to-vehicle collision in a direction of a passenger seat in case that the right front acceleration is within a second right front acceleration range of the configuration range and the center right acceleration is within a third center right acceleration range of the configuration range.

In the detecting of the crash type of the vehicle, the crash type detection unit discriminates the crash type as a local collision in the direction of the driver's seat in case that the left front acceleration is within the second left front acceleration range of the configuration range and the center left acceleration is within a second center left acceleration range of the configuration range.

In the detecting of the crash type of the vehicle, the crash type detection unit discriminates the crash type as a local collision in the direction of the passenger seat in case that the right front acceleration is within the second right front acceleration range of the configuration range and the center right acceleration is within a second center right acceleration range of the configuration range.

In the detecting of the crash type of the vehicle, the crash type detection unit discriminates the crash type as a slope collision in the direction of the driver's seat in case that the left front acceleration is within a first left front acceleration range of the configuration range and the center left acceleration is within a first center left acceleration range of the configuration range.

In the detecting of the crash type of the vehicle, the crash type detection unit discriminates the crash type as a slope collision in the direction of the passenger seat in case that the right front acceleration is within a first right front acceleration range of the configuration range and the center right acceleration is within a first center right acceleration range of the configuration range.

In the detecting of the crash type of the vehicle, the crash type detection unit discriminates the crash type as an offset collision in the direction of the driver's seat in case that the left front acceleration is not included in the first and second left front acceleration ranges of the configuration range and the center left acceleration is not included in the first to third center left acceleration ranges of the configuration range.

In the detecting of the crash type of the vehicle, the crash type detection unit discriminates the crash type as an offset collision in the direction of the passenger seat in case that the right front acceleration is not included in the first and second right front acceleration ranges of the configuration range and the center right acceleration is not included in the first to third center right acceleration ranges of the configuration range.

An apparatus and a method to detect a crash type of a vehicle according to one aspect of the disclosure can detect the crash type of the vehicle using high frequency components of accelerations input from sensors configured to sense the vehicle collision.

An apparatus and a method to detect a crash type of a vehicle according to another aspect of the disclosure can secure accuracy of an airbag deployment time and airbag deployment performance by accurately discriminating the crash type of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIGS. 4(a), 4(b), and 4(c) are a flowchart illustrating a method to detect a crash type of a vehicle according to an embodiment of the disclosure.

DETAILED DESCRIPTION OF THE ILLUSTRATED EMBODIMENTS

Figure 1:
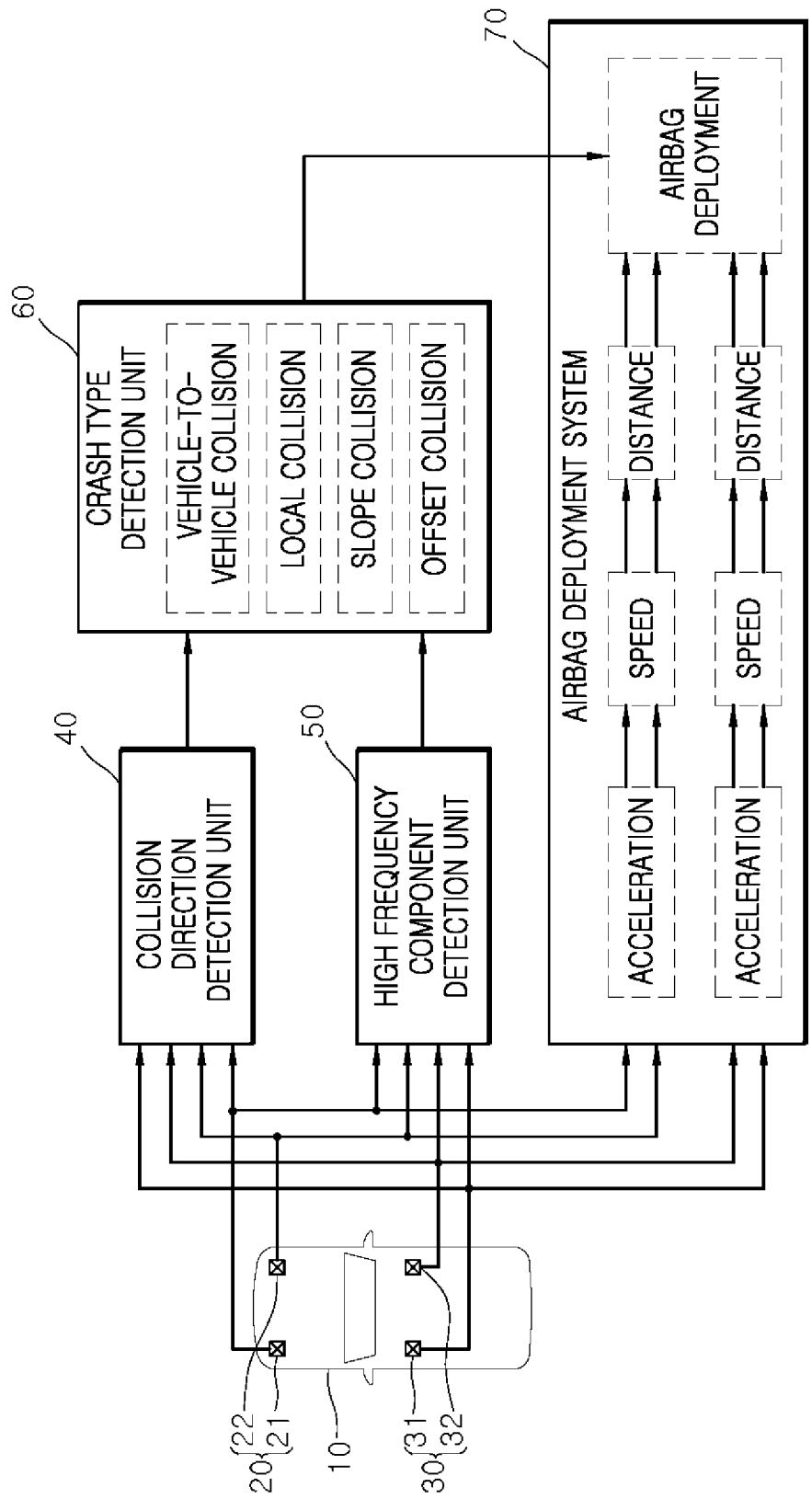
FIG. 1 is a block diagram illustrating the configuration of an apparatus configured to detect a crash type of a vehicle according to an embodiment of the disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Figure 2:
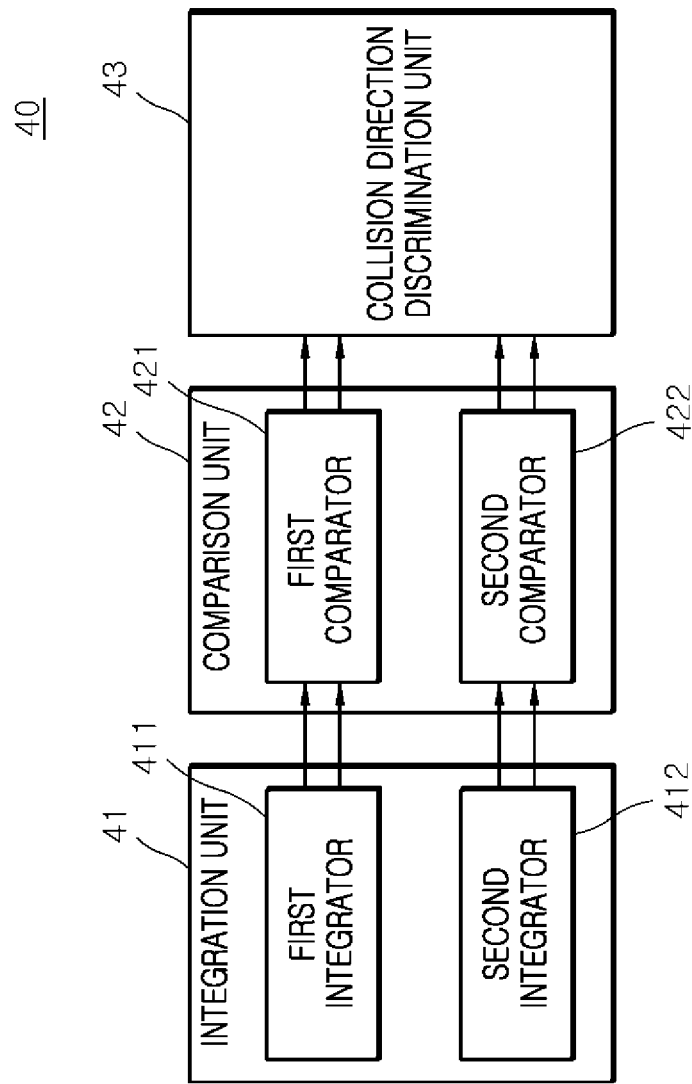
FIG. 2 is a block diagram illustrating the configuration of a collision direction detection unit according to an embodiment of the disclosure.
Figure 3:
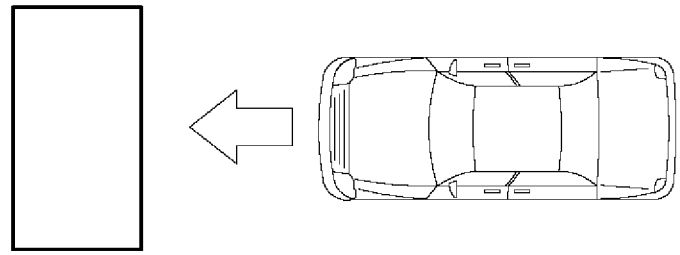
FIG. 3 is a diagram illustrating the crash type of a vehicle.
Figure 3:
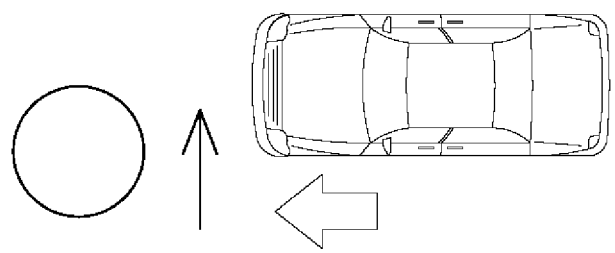
Figure 3:
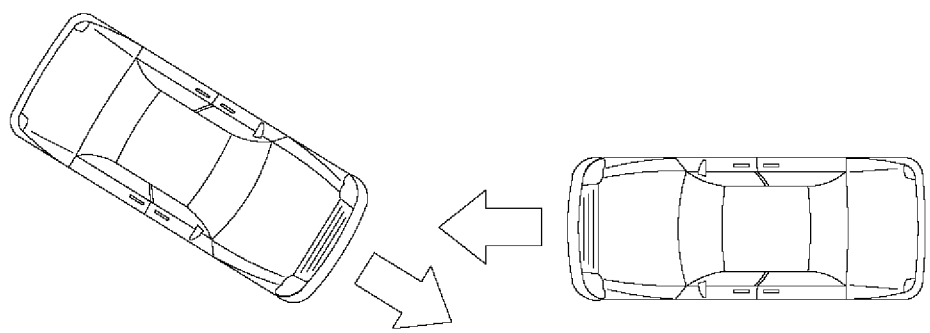

FIG. 1 is a block diagram illustrating the configuration of an apparatus configured to detect a crash type of a vehicle according to an embodiment of the disclosure, FIG. 2 is a block diagram illustrating the configuration of a collision direction detection unit according to an embodiment of the disclosure, and FIG. 3 is a diagram explaining the crash type of a vehicle.

Referring to FIG. 1, the apparatus configured to detect a crash type of a vehicle according to an embodiment of the disclosure includes a front acceleration sensor 20, a center acceleration sensor 30, a collision direction detection unit 40, a high frequency component detection unit 50, and a crash type detection unit 60.

The front acceleration sensor 20 is installed in the front of a vehicle 10, and detects a left front acceleration and a right front acceleration of the vehicle 10. The front acceleration sensor 20 includes a left front acceleration sensor 21 and a right front acceleration sensor 22.

The left front acceleration sensor 21 is installed on the left side of the front of the vehicle, and senses the left front acceleration of the vehicle 10.

The right front acceleration sensor 22 is installed on the right side of the front of the vehicle, and senses the right front acceleration of the vehicle 10.

The center acceleration sensor 30 is installed in the center of the vehicle 10, and senses a center left acceleration and a center right acceleration of the vehicle 10. The center acceleration sensor 30 includes a center left acceleration sensor 31 and a center right acceleration sensor 32.

The center left acceleration sensor 31 is installed in the center left of the vehicle 10, and senses a center left acceleration of the vehicle 10.

The center right acceleration sensor 32 is installed in the center right of the vehicle 10, and senses a center right acceleration of the vehicle 10.

The collision direction detection unit 40 detects the collision direction of the vehicle 10. The collision direction is classified into a left collision, a right collision, and a head-on collision. That is, the collision direction detection unit 40 classifies the collision direction of the vehicle 10 into any one of the left collision, the right collision, and the head-on collision.

Referring to FIG. 2, the collision direction detection unit 40 includes an integration unit 41, a comparison unit 42, and a collision direction discrimination unit 43.

The integration unit 41 integrates the left front acceleration and the right front acceleration sensed by the front acceleration sensor 20 and the center left acceleration and the center right acceleration sensed by the center acceleration sensor 30.

The integration unit 41 includes a first integrator 411 and a second integrator 412. The first integrator 411 integrates the left front acceleration and the right front acceleration, and the second integrator 412 integrates the center left acceleration and the center right acceleration.

The comparison unit 42 compares the left front acceleration and the right front acceleration integrated by the integration unit 41 with each other, and compares the center left acceleration and the center right acceleration with each other. The comparison unit 42 includes a first comparator 421 and a second comparator 422.

The first comparator 421 compares the left front acceleration and the right front acceleration with each other, and outputs which is relatively higher between the left front acceleration and the right front acceleration.

The second comparator 422 compares the center left acceleration and the center right acceleration with each other, and outputs which is relatively higher between the center left acceleration and the center right acceleration.

The collision direction discrimination unit 43 discriminates the collision direction in accordance with the result of the comparison performed by the comparison unit 42. That is, the collision direction discrimination unit 43 receives, from the comparison unit 42, the result of the comparison between the left front acceleration and the right front acceleration and the result of the comparison between the center left acceleration and the center right acceleration, and discriminates, based on the result of the comparison, the collision direction as any one of the left collision, the right collision, and the head-on collision.

In this case, if the left front acceleration is higher than the right front acceleration as the result of the comparison performed by the first comparator 421 and the center left acceleration is higher than the center right acceleration as the result of the comparison performed by the second comparator 422, the collision direction discrimination unit 43 discriminates the collision direction as the left collision.

If the right front acceleration is higher than the left front acceleration as the result of the comparison performed by the first comparator 421 and the center right acceleration is higher than the center left acceleration as the result of the comparison performed by the second comparator 422, the collision direction discrimination unit 43 discriminates the collision direction as the right collision.

If none of a condition to discriminate the collision direction as the left collision and a condition to discriminate the collision direction as the right collision is satisfied, the collision direction discrimination unit 43 discriminates the collision direction as the head-on collision.

The high frequency component detection unit 50 detects the high frequency components of the left front acceleration, the right front acceleration, the center left acceleration, and the center right acceleration, which are sensed by the front acceleration sensor 20 and the center acceleration sensor 30, by filtering the respective sensed accelerations.

Usually, the left front acceleration, the right front acceleration, the center left acceleration, and the center right acceleration, which are sensed by the front acceleration sensor 20 and the center acceleration sensor 30, occur differently for each crash type due to a difference in stiffness between vehicle structures during the vehicle collision. That is, the left front acceleration, the right front acceleration, the center left acceleration, and the center right acceleration have different high frequency components for each crash type. Accordingly, in the present embodiment, the crash types are discriminated based on the accelerations (the left front acceleration, the right front acceleration, the center left acceleration, and the center right acceleration) of the high frequency components occurring differently for each crash type.

The crash type is classified into a vehicle-to-vehicle collision, a local collision, a slope collision, and an offset collision with respect to the left collision and the right collision. Here, the left collision is a collision in a direction of a driver's seat, and the right collision is a collision in a direction of a passenger seat. The crash types are as illustrated in FIG. 3.

The crash type detection unit 60 detects the crash type of the vehicle 10 using the left front acceleration, the right front acceleration, the center left acceleration, and the center right acceleration of the high frequency components in accordance with the collision direction detected by the collision direction detection unit 40.

The crash type detection unit 60 detects the crash type in case that the collision direction detected by the collision direction detection unit 40 is the left collision or the right collision.

That is, if the collision direction is the left collision or the right collision, the crash type detection unit 60 detects the crash type based on the left front acceleration, the right front acceleration, the center left acceleration, and the center right acceleration of the high frequency components in a manner that if the collision direction is the left collision, that is, in the direction of the driver's seat, the crash type detection unit 60 discriminates the crash type as one of the vehicle-to-vehicle collision, the local collision, the slope collision, and the offset collision in the direction of the driver's seat, whereas if the collision direction is the right collision, that is, in the direction of the passenger seat, the crash type detection unit 60 discriminates the crash type as one of the vehicle-to-vehicle collision, the local collision, the slope collision, and the offset collision in the direction of the passenger seat.

For this, the configuration range to detect the crash type is predetermined with respect to the left front acceleration, the right front acceleration, the center left acceleration, and the center right acceleration.

The configuration range is an acceleration range of the high frequency components predetermined to discriminate the crash type as one of the vehicle-to-vehicle collision, the local collision, the slope collision, and the offset collision.

The configuration range is diversely configured in accordance with an impact amount and the collision direction during the vehicle-to-vehicle collision, the local collision, the slope collision, and the offset collision.

For example, the configuration range configured with respect to the left front acceleration is divided into a first left front acceleration range that is equal to or higher than a first left front acceleration threshold value and lower than a second left front acceleration threshold value and a second left front acceleration range that is equal to or higher than the second left front acceleration threshold value, based on the first left front acceleration threshold value and the second left front acceleration threshold value. Here, the second left front acceleration threshold value is larger than the first left front acceleration threshold value.

The configuration range configured with respect to the right front acceleration is divided into a first right front acceleration range that is equal to or higher than a first right front acceleration threshold value and lower than a second right front acceleration threshold value and a second right front acceleration range that is equal to or higher than the second right front acceleration threshold value, based on the first right front acceleration threshold value and the second right front acceleration threshold value. Here, the second right front acceleration threshold value is larger than the first right front acceleration threshold value.

The configuration range configured with respect to the center left acceleration is divided into a first center left acceleration range that is equal to or higher than a first center left acceleration threshold value and lower than a second center left acceleration threshold value, a second center left acceleration range that is equal to or higher than the second center left acceleration threshold value and lower than a third center left acceleration threshold value, and a third center left acceleration range that is equal to or higher than the third center left acceleration threshold value, based on the first center left acceleration threshold value, the second center left acceleration threshold value, and the third center left acceleration threshold value. Here, the third center left acceleration threshold value is larger than the second center left acceleration threshold value, and the second center left acceleration threshold value is larger than the first center left acceleration threshold value.

The configuration range configured with respect to the center right acceleration is divided into a first center right acceleration range that is equal to or higher than a first center right acceleration threshold value and lower than a second center right acceleration threshold value, a second center right acceleration range that is equal to or higher than the second center right acceleration threshold value and lower than a third center right acceleration threshold value, and a third center right acceleration range that is equal to or higher than the third center right acceleration threshold value, based on the first center right acceleration threshold value, the second center right acceleration threshold value, and the third center right acceleration threshold value. Here, the third center right acceleration threshold value is larger than the second center right acceleration threshold value, and the second center right acceleration threshold value is larger than the first center right acceleration threshold value.

Accordingly, the crash type detection unit 60 discriminates the crash type as the vehicle-to-vehicle collision in the direction of the driver's seat in case that the left front acceleration is within the second left front acceleration range of the configuration range and the center left acceleration is within the third center left acceleration range of the configuration range.

The crash type detection unit 60 discriminates the crash type as the local collision in the direction of the driver's seat in case that the left front acceleration is within the second left front acceleration range of the configuration range and the center left acceleration is within the second center left acceleration range of the configuration range.

The crash type detection unit 60 discriminates the crash type as the slope collision in the direction of the driver's seat in case that the left front acceleration is within the first left front acceleration range of the configuration range and the center left acceleration is within the first center left acceleration range of the configuration range.

The crash type detection unit 60 discriminates the crash type as the offset collision in the direction of the driver's seat in case that the left front acceleration is not included in the first and second left front acceleration ranges of the configuration range and the center left acceleration is not included in the first to third center left acceleration ranges of the configuration range.

Further, the crash type detection unit 60 discriminates the crash type as the vehicle-to-vehicle collision in the direction of the passenger seat in case that the right front acceleration is within the second right front acceleration range of the configuration range and the center right acceleration is within the third center right acceleration range of the configuration range.

The crash type detection unit 60 discriminates the crash type as the local collision in the direction of the passenger seat in case that the right front acceleration is within the second right front acceleration range of the configuration range and the center right acceleration is to within the second center right acceleration range of the configuration range.

The crash type detection unit 60 discriminates the crash type as the slope collision in the direction of the passenger seat in case that the right front acceleration is within the first right front acceleration range of the configuration range and the center right acceleration is within the first center right acceleration range of the configuration range.

The crash type detection unit 60 discriminates the crash type as the offset collision in the direction of the passenger seat in case that the right front acceleration is not included in the first and second right front acceleration ranges of the configuration range and the center right acceleration is not included in the first to third center right acceleration ranges of the configuration range.

The airbag deployment system 70 detects left and right front speeds by integrating the left front acceleration and the right front acceleration sensed by the front acceleration sensor 20, detects speeds and center left and right distances by secondarily integrating the center left and right accelerations sensed by the center acceleration sensor 30, and then controls the airbag deployment based on the detected speeds and distances.

In this case, the airbag deployment system 70 may select an airbag to be deployed or may adjust the airbag deployment time, in accordance with the crash type detected by the crash type detection unit 60 as described above.

Hereinafter, a method to detect a crash type of a vehicle according to an embodiment of the disclosure will be described in detail with reference to FIG. 4.

Figure 4A:
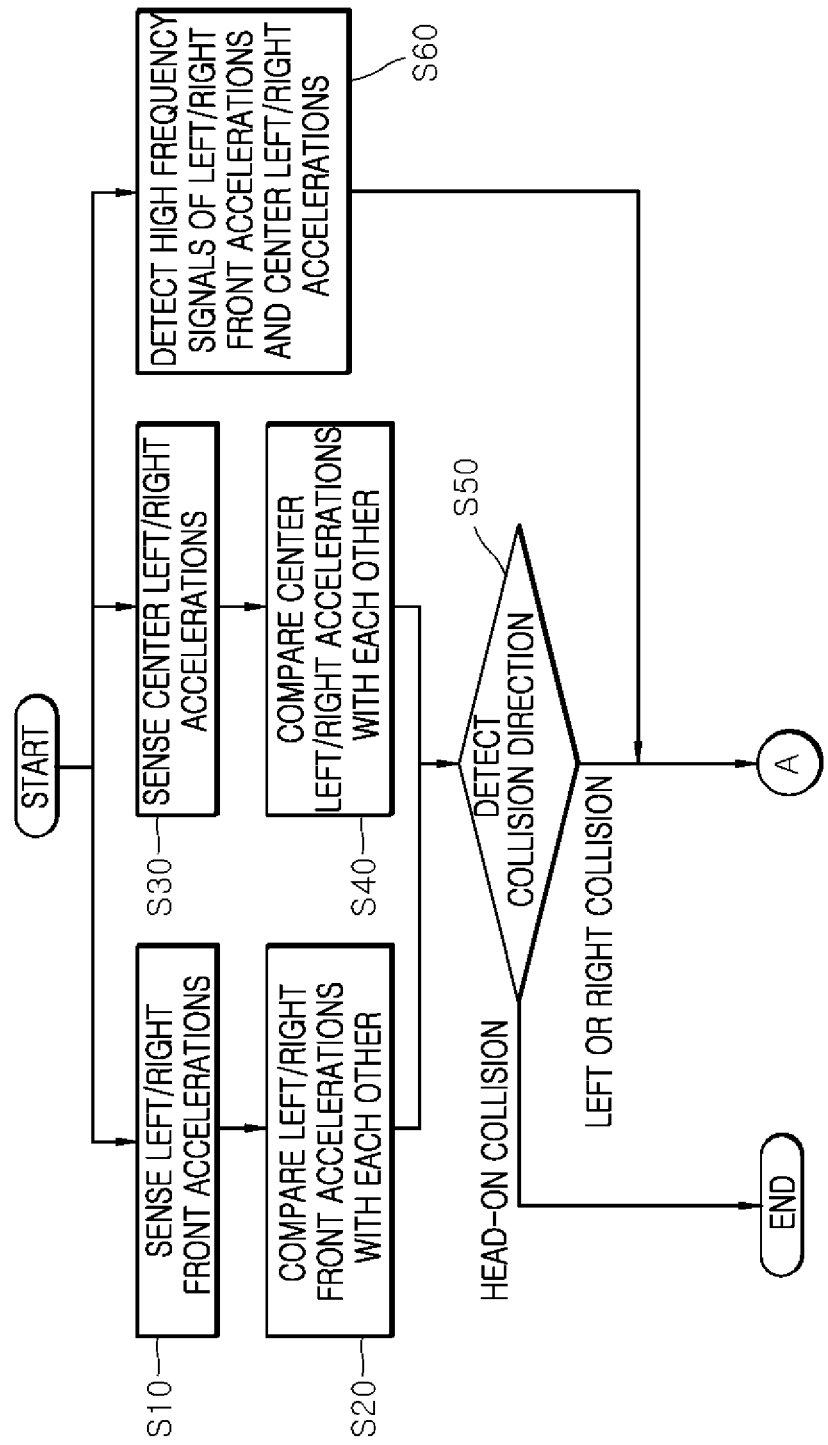
Figure 4C:
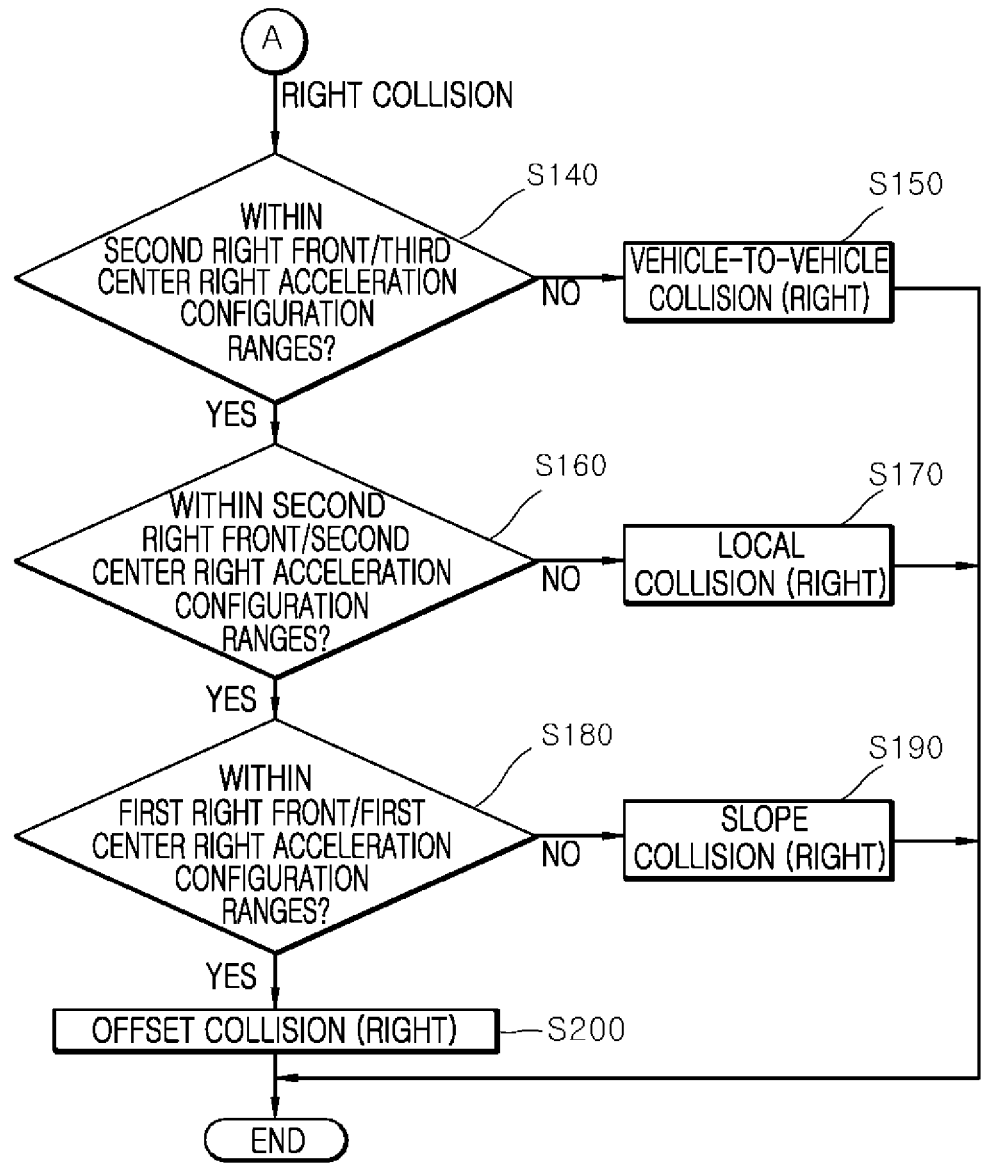

FIG. 4 is a flowchart illustrating a method to detect a crash type of a vehicle according to an embodiment of the disclosure.

Referring to FIG. 4(*a*), the front acceleration sensor 20 first senses a left front acceleration and a right front acceleration of the vehicle 10 (S10).

Then, the first integrator 411 integrates the left front acceleration and the right front acceleration, and the first comparator 421 compares (S20) the integrated left front acceleration and right front acceleration with each other, and inputs the result of the comparison to the collision direction discrimination unit 43.

Meanwhile, the center acceleration sensor 30 senses a center left acceleration and a center right acceleration of the vehicle 10 (S30).

Then, the second integrator 412 integrates the center left acceleration and the center right acceleration, and the second comparator 422 compares (S40) the integrated center left acceleration and center right acceleration with each other, and inputs the result of the comparison to the collision direction discrimination unit 43.

The collision direction discrimination unit 43 discriminates the collision direction as any one of the left collision, the right collision, and the head-on collision in accordance with the results of the comparisons performed by the first comparator 421 and the second comparator 422 (S50).

In this case, if the left front acceleration is higher than the right front acceleration as the result of the comparison performed by the first comparator 421 and the center left acceleration is higher than the center right acceleration as the result of the comparison performed by the second comparator 422, the collision direction discrimination unit 43 discriminates the collision direction as the left collision. Further, if the right front acceleration is higher than the left front acceleration as the result of the comparison performed by the first comparator 421 and the center right acceleration is higher than the center left acceleration as the result of the comparison performed by the second comparator 422, the collision direction discrimination unit 43 discriminates the collision direction as the right collision.

Further, if none of the condition to discriminate the collision direction as the left collision and the condition to discriminate the collision direction as the right collision is satisfied, the collision direction discrimination unit 43 discriminates the collision direction as the head-on collision.

Meanwhile, the high frequency component detection unit 50 detects the high frequency components of the left front acceleration, the right front acceleration, the center left acceleration, and the center right acceleration, which are sensed by the front acceleration sensor 20 and the center acceleration sensor 30, by filtering the respective sensed accelerations (S60).

Referring to FIG. 4(*b*), in case that the collision direction is the left collision, the crash type detection unit 60 discriminates the crash type as the vehicle-to-vehicle collision in the direction of the driver's seat in case that the left front acceleration is within the second left front acceleration range of the configuration range and the center left acceleration is within the third center left acceleration range of the configuration range (S70 and S80).

The crash type detection unit 60 discriminates the crash type as the local collision in the direction of the driver's seat in case that the left front acceleration is within the second left front acceleration range of the configuration range and the center left acceleration is within the second center left acceleration range of the configuration range (S90 and S100).

The crash type detection unit 60 discriminates the crash type as the slope collision in the direction of the driver's seat in case that the left front acceleration is within the first left front acceleration range of the configuration range and the center left acceleration is within the first center left acceleration range of the configuration range (S110 and S120).

The crash type detection unit 60 discriminates the crash type as the offset collision in the direction of the driver's seat in case that the left front acceleration is not included in the first and second left front acceleration ranges of the configuration range and the center left acceleration is not included in the first to third center left acceleration ranges of the configuration range (S130).

Meanwhile, referring to FIG. 4(*c*), in case that the collision direction is the right collision, the crash type detection unit 60 discriminates the crash type as the vehicle-to-vehicle collision in the direction of the passenger seat in case that the right front acceleration is within the second right front acceleration range of the configuration range and the center right acceleration is within the third center right acceleration range of the configuration range (S140 and S150).

The crash type detection unit 60 discriminates the crash type as the local collision in the direction of the passenger seat in case that the right front acceleration is within the second right front acceleration range of the configuration range and the center right acceleration is within the second center right acceleration range of the configuration range (S160 and S170).

The crash type detection unit 60 discriminates the crash type as the slope collision in the direction of the passenger seat in case that the right front acceleration is within the first right front acceleration range of the configuration range and the center right acceleration is within the first center right acceleration range of the configuration range (S180 and S190).

The crash type detection unit 60 discriminates the crash type as the offset collision in the direction of the passenger seat in case that the right front acceleration is not included in the first and second right front acceleration ranges of the configuration range and the center right acceleration is not included in the first to third center right acceleration ranges of the configuration range (S200).

Meanwhile, as the crash type is detected as described above, the airbag deployment system 70 may select an airbag to be deployed or may control the airbag deployment time in accordance with the crash type detected by the crash type detection unit 60 as described above.

As described above, the apparatus and the method to detect a crash type of a vehicle according to an embodiment of the disclosure can detect the crash type of the vehicle using the high frequency components of the accelerations input from the sensors configured to sense the vehicle collision.

Further, the apparatus and the method to detect a crash type of a vehicle according to another embodiment of the disclosure can secure the accuracy of the airbag deployment time and the airbag deployment performance by accurately discriminating the crash type of the vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus configured to detect a crash type of a vehicle, comprising:
   a front acceleration sensor configured to sense a left front acceleration and a right front acceleration in a front of a vehicle;
   a center acceleration sensor configured to sense a center left acceleration and a center right acceleration in a center of the vehicle;
   a collision direction detection unit configured to detect a collision direction of the vehicle using the left front acceleration, the right front acceleration, the center left acceleration, and the center right acceleration;
   a high frequency component detection unit configured to detect high frequency components by filtering the left front acceleration, the right front acceleration, the center left acceleration, and the center right acceleration; and
   a crash type detection unit configured to detect a crash type of the vehicle using the left front acceleration, the right front acceleration, the center left acceleration, and the center right acceleration of the high frequency components in accordance with the collision direction detection unit.

2. The apparatus of claim 1, wherein the collision direction detection unit comprises:
   an integration unit configured to integrate the left front acceleration, the right front acceleration, the center left acceleration, and the center right acceleration;
   a comparison unit configured to compare the left front acceleration and the right front acceleration integrated by the integration unit with each other and to compare the center left acceleration and the center right acceleration with each other; and a collision direction discrimination unit configured to discriminate the collision direction based on the result of comparing the left front acceleration and the right front acceleration with each other and the result of comparing the center left acceleration and the center right acceleration with each other.

3. The apparatus of claim 2, wherein the collision direction discrimination unit is configured to discriminate the collision direction as a left collision in case that the left front acceleration is higher than the right front acceleration and the center left acceleration is higher than the center right acceleration, and to discriminate the collision direction as a right collision in case that the right front acceleration is higher than the left front acceleration and the center right acceleration is higher than the center left acceleration.

4. The apparatus of claim 1, wherein the crash type detection unit is configured to detect the crash type in case that the collision direction is the left collision or the right collision.

5. The apparatus of claim 1, wherein the crash type detection unit is configured to detect the crash type in accordance with a configuration range including the left front acceleration, the right front acceleration, the center left acceleration, and the center right acceleration of the high frequency components.

6. The apparatus of claim 1, wherein the crash type detection unit is configured to discriminate the crash type as a vehicle-to-vehicle collision in a direction of a driver's seat in case that the left front acceleration is within a second left front acceleration range of a configuration range and the center left acceleration is within a third center left acceleration range of the configuration range.

7. The apparatus of claim 1, wherein the crash type detection unit is configured to discriminate the crash type as a vehicle-to-vehicle collision in a direction of a passenger seat in case that the right front acceleration is within a second right front acceleration range of a configuration range and the center right acceleration is within a third center right acceleration range of the configuration range.

8. The apparatus of claim 1, wherein the crash type detection unit is configured to discriminate the crash type as a local collision in the direction of the driver's seat in case that the left front acceleration is within a second left front acceleration range of a configuration range and the center left acceleration is within a second center left acceleration range of the configuration range.

9. The apparatus of claim 1, wherein the crash type detection unit is configured to discriminate the crash type as a local collision in the direction of the passenger seat in case that the right front acceleration is within a second right front acceleration range of a configuration range and the center right acceleration is within a second center right acceleration range of the configuration range.

10. The apparatus of claim 1, wherein the crash type detection unit is configured to discriminate the crash type as a slope collision in the direction of the driver's seat in case that the left front acceleration is within a first left front acceleration range of a configuration range and the center left acceleration is within a first center left acceleration range of the configuration range.

11. The apparatus of claim 1, wherein the crash type detection unit is configured to discriminate the crash type as a slope collision in the direction of the passenger seat in case that the right front acceleration is within a first right front acceleration range of a configuration range and the center right acceleration is within a first center right acceleration range of the configuration range.

12. The apparatus of claim 1, wherein the crash type detection unit is configured to discriminate the crash type as an offset collision in the direction of the driver's seat in case that the left front acceleration is not included in the first and second left front acceleration ranges of a configuration range and the center left acceleration is not included in the first to third center left acceleration ranges of the configuration range.

13. The apparatus of claim 1, wherein the crash type detection unit is configured to discriminate the crash type as an offset collision in the direction of the passenger seat in case that the right front acceleration is not included in the first and second right front acceleration ranges of a configuration range and the center right acceleration is not included in the first to third center right acceleration ranges of the configuration range.

14. A method to detect a crash type of a vehicle, comprising:
sensing, by a front acceleration sensor, a left front acceleration and a right front acceleration in the front of a vehicle;
sensing, by a center acceleration sensor, a center left acceleration and a center right acceleration in the center of the vehicle;
detecting, by a collision direction detection unit, a collision direction of the vehicle using the left front acceleration, the right front acceleration, the center left acceleration, and the center right acceleration;
detecting, by a high frequency component detection unit, high frequency components by filtering the left front acceleration, the right front acceleration, the center left acceleration, and the center right acceleration; and
detecting, by a crash type detection unit, a crash type of the vehicle using the left front acceleration, the right front acceleration, the center left acceleration, and the center right acceleration of the high frequency components in case that the collision direction is a left collision or a right collision.

15. The method of claim 14, wherein in the detecting of the collision direction of the vehicle, the collision direction detection unit discriminates the collision direction as the left collision in case that the left front acceleration is higher than the right front acceleration and the center left acceleration is higher than the center right acceleration, and discriminates the collision direction as the right collision in case that the right front acceleration is higher than the left front acceleration and the center right acceleration is higher than the center left acceleration.

16. The method of claim 14, wherein in the detecting of the crash type of the vehicle, the crash type detection unit detects the crash type in accordance with a configuration range including the left front acceleration, the right front acceleration, the center left acceleration, and the center right acceleration of the high frequency components.

17. The method of claim 14, wherein in the detecting of the crash type of the vehicle, the crash type detection unit discriminates the crash type as a vehicle-to-vehicle collision in a direction of a driver's seat in case that the left front acceleration is within a second left front acceleration range of a configuration range and the center left acceleration is within a third center left acceleration range of the configuration range,
and crash type detection unit discriminates the crash type as a vehicle-to-vehicle collision in a direction of a passenger seat in case that the right front acceleration is within a second right front acceleration range of the configuration range and the center right acceleration is within a third center right acceleration range of the configuration range.

18. The method of claim 14, wherein in the detecting of the crash type of the vehicle, the crash type detection unit discriminates the crash type as a local collision in the direction of the driver's seat in case that the left front acceleration is within a second left front acceleration range of a configuration range and the center left acceleration is within a second center left acceleration range of the configuration range, and the crash type detection unit discriminates the crash type as a local collision in the direction of the passenger seat in case that the right front acceleration is within a second right front acceleration range of the configuration range and the center right acceleration is within a second center right acceleration range of the configuration range.

19. The method of claim 14, wherein in the detecting of the crash type of the vehicle, the crash type detection unit discriminates the crash type as a slope collision in the direction of the driver's seat in case that the left front acceleration is within a first left front acceleration range of a configuration range and the center left acceleration is within a first center left acceleration range of the configuration range, and the crash type detection unit discriminates the crash type as a slope collision in the direction of the passenger seat in case that the right front acceleration is within a first right front acceleration range of the configuration range and the center right acceleration is within a first center right acceleration range of the configuration range.

20. The method of claim 14, wherein in the detecting of the crash type of the vehicle, the crash type detection unit discriminates the crash type as an offset collision in the direction of the driver's seat in case that the left front acceleration is not included in the first and second left front acceleration ranges of a configuration range and the center left acceleration is not included in the first to third center left acceleration ranges of the configuration range, and the crash type detection unit discriminates the crash type as an offset collision in the direction of the passenger seat in case that the right front acceleration is not included in the first and second right front acceleration ranges of the configuration range and the center right acceleration is not included in the first to third center right acceleration ranges of the configuration range.

* * * * *